United States Patent [19]

Golden

[11] 4,135,973
[45] Jan. 23, 1979

[54] CORE DISRUPTIVE ACCIDENT MARGIN SEAL

[75] Inventor: Martin P. Golden, Penn Township, Allegheny County, Pa.

[73] Assignee: The United States of America as represented by the United States Department of Energy, Washington, D.C.

[21] Appl. No.: 776,328

[22] Filed: Mar. 10, 1977

[51] Int. Cl.² .............................................. G21C 9/00
[52] U.S. Cl. ........................................ 176/87; 176/38; 220/232; 220/239; 220/240
[58] Field of Search .................... 176/40, 87, 50, 38, 176/65; 220/232, 239, 240, 320

[56] References Cited

U.S. PATENT DOCUMENTS

| | | | |
|---|---|---|---|
| 1,603,903 | 10/1926 | Church | 220/240 |
| 2,016,226 | 10/1935 | Clausen | 220/240 |
| 3,043,469 | 7/1962 | Leach | 220/239 |
| 3,514,115 | 5/1970 | Gallo | 176/87 |
| 3,533,530 | 10/1970 | Gallo et al. | 176/87 |
| 3,819,479 | 6/1974 | Jacquelin | 176/87 |
| 3,984,942 | 10/1976 | Schroth | 220/232 |
| 4,026,763 | 5/1977 | Poindexter | 176/37 |
| 4,050,987 | 9/1977 | Wade | 176/87 |

FOREIGN PATENT DOCUMENTS

B29,050 9/1955 Fed. Rep. of Germany ........... 220/239

Primary Examiner—Harvey E. Behrend
Attorney, Agent, or Firm—L. A. DePaul; Z. L. Dermer

[57] ABSTRACT

Apparatus for sealing the annulus defined within a substantially cylindrical rotatable riser assembly and plug combination of a nuclear reactor closure head. The apparatus comprises an inflatable sealing mechanism disposed in one portion of the riser assembly near the annulus such that upon inflation the sealing mechanism is radially actuated against the other portion of the riser assembly thereby sealing the annulus. The apparatus further comprises a connecting mechanism which places one end of the sealing mechanism in fluid communication with the reactor cover gas so that overpressurization of the reactor cover gas will increase the radial actuation of the sealing mechanism thus enhancing sealing of the annulus.

1 Claim, 5 Drawing Figures

CORE DISRUPTIVE ACCIDENT MARGIN SEAL

GOVERNMENT CONTRACT

The invention described herein was made in the couse of, or under, Contract No. E(49-18)-12-3 with the United States Energy Research and Development Administration.

CROSS-REFERENCE TO RELATED APPLICATIONS

The invention herein disclosed is related to copending applications Ser. No. 714,220, entitled "Core Disruptive Accident Margin Seal," filed Aug. 13, 1976 by J. Garin and J. C. Belsick and Ser. No. 714,221, entitled "Core Disruptive Accident Margin Seal" filed Aug. 13, 1976 by J. Garin (now U.S. Pat. No. 4,078,969) both of which have been assigned to the assignee of the present application.

BACKGROUND OF THE INVENTION

This invention relates to seals and more particularly to seals for components of closure heads of nuclear reactors.

In nuclear reactor designs well known in the art, a reactor vessel with fuel assemblies disposed therein and having an inlet and an outlet for circulation of a coolant in heat transfer relationship with the fuel assemblies, is sealed by a closure head located on top of the reactor vessel. In certain designs, the closure head comprises one or more rotatable plugs. These rotatable plugs, which may be of varying sizes disposed eccentrically within each other, serve at least two purposes. One purpose is, of course, to seal the reactor internals inside the reactor vessel. Another purpose is to support refueling machines. The rotation of the rotatable plugs positions the refueling machines in appropriate relationship to the fuel assemblies in the reactor vessel to facilitate the refueling process. Since the rotatable plugs must be able to rotate relative to each other, the plugs are mounted so as to define an annulus between them. The annulus, while allowing the rotation of the plugs, also establishes a path for the release of radioactive particles located in the reactor vessel. Accordingly, seals are provided at various locations across the annulus to prevent this release of radioactive particles. The seals also function to prevent oxygen in the atmosphere outside the reactor vessel from passing through the annulus to the reactor coolant which in a liquid metal fast breeder reactor may be liquid sodium because contact of liquid sodium with oxygen may result in the formation of impurities in the liquid sodium. To further prevent oxygen leakage into the reactor vessel, a cover gas is provided that fills the space from the top of the reactor coolant pool to the bottom of the closure head and up the annulus to the seals across the annulus.

In the process of designing such liquid metal fast breeder reactors, it is common practice to analyze the effectiveness of the closure head seals under extreme conditions that are highly unlikely to occur to thereby assure the effectiveness of such seals under normal conditions. During the course of such design the seals are subjected to a sophisticated analysis which determines the seal response under a hypothetical core disruptive accident (CDA), theoretically the worst possible accident. Typically, the CDA is hypothesized to be a case in which, for whatever reason, a void violently propagates in the reactor coolant causing a violent expansion of the reactor coolant which in turn forces the cover gas up the annulus between the closure head plugs where the cover gas and liquid sodium are hypothesized to impact the closure head seals which are across the annulus. To meet design requirements, the seals must be able to contain the cover gas and liquid sodium which will have radioactive particles therein in order to prevent a release of radioactive particles to outside the reactor vessel. There are several kinds of effective closure head seals known in the art.

One type of closure head seal well known to those skilled in the art is a liquid dip seal. In a liquid dip seal, the annulus between the closure head plugs is contoured so that a trough is formed by the annulus itself. A liquid such as liquid sodium is placed in the trough thereby dividing the annulus into two sections, one above the liquid and one below. The cover gas, inside the reactor, containing radioactive particles then extends from the top of the reactor coolant pool up through the annulus to the liquid sodium in the dip seal. The liquid dip seal under normal conditions provides an effective seal against cover gas migration out of the annulus and against oxygen migration into the reactor vessel while allowing the rotatable closure head plugs to rotate relative to each other. However, under the CDA analysis, the expansion of the reactor coolant could force the cover gas up the annulus in a violent manner. In the process, the cover gas could expel the liquid sodium from the dip seal onto seals and bearings located in the annulus above the dip seal, thereby rendering the liquid dip seal ineffective under such hypothesized conditions.

Another type of closure head seal well known in the art is the inflatable seal wherein single or multiple inflatable seals in series are placed across the annulus. During reactor refueling, the inflatable seals are slightly deflated to allow better rotation of the rotatable closure head plugs while during reactor operation the seals are inflated to increase their sealing capability. Examples of these types of seals may be found in U.S. Pat. No. 3,514,115 to S. Galio, issued May 26, 1970 and in U.S. Pat. No. 3,819,479 to R. Jacquelin, issued June 25, 1974.

Still another seal well known in the art and designed specifically for CDA conditions is a type of labyrinth seal in which a piece of metal is bolted to one of the closure head plugs so as to extend across the annulus between the plugs to within close proximity to the other plug. The purpose of this seal is to effectively lower the leak path area to thus limit leakage under CDA. However, when subjected to analysis, this seal while theoretically reducing leakage and allowing plug rotation, does not completely solve the problem of preventing release of radioactive particles under severe reactor conditions such as CDA.

In copending application Ser. No. 714,220 entitled "Core Disruptive Accident Margin Seal" filed Aug. 13, 1976 by J. Garin and J. C. Belsick there is described apparatus for sealing the annulus between riser assemblies that comprises a flexible member disposed in the annulus and attached to an actuating mechanism. The actuating mechanism is capable of pulling the flexible member into contact with the components of the riser assemblies thereby sealing the annulus.

Another sealing mechanism is described in copending application Ser. No. 714,221 entitled "Core Disruptive Accident Margin Seal" filed Aug. 13, 1976 by J. Garin, now U.S. Pat. No. 4,078,969. The seal described therein comprises a flexible member attached to one of the riser components and extending across the annulus to near the other riser component. When desired an actuating mechanism causes the flexible member to contact the other riser component thereby sealing the annulus between the components.

In addition, the other commonly known types of seals such as O-rings, bellows, etc., while possibly effective under CDA conditions, do not allow for effective rotation of the closure head plugs.

SUMMARY OF THE INVENTION

Apparatus for sealing the annulus defined within a substantially cylindrical rotatable riser assembly and plug combination of a nuclear reactor closure head. The apparatus comprises an inflatable sealing mechanism disposed in a portion of a riser assembly with a first end of the inflatable sealing mechanism arranged near the annulus and with an inflation mechanism connected to the second end such that upon inflation the sealing mechanism is radially actuated against the other portion of the riser assembly thereby sealing the annulus. The apparatus further comprises a connecting mechanism which places the second end of the inflatable sealing mechanism in fluid communication with the reactor cover gas so that overpressurization of the reactor cover gas will increase the radial actuation of the sealing mechanism thus enhancing sealing of the annulus.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

In designs of nuclear reactors that utilize rotatable plugs in the closure head of the reactor vessel, there exist annular passageways defined between the rotatable plugs and associated apparatus which allow the rotation of the plugs. In order to meet strict design requirements, seals must be provided that are capable of sealing these passageways under severe reactor conditions. The invention described herein serves to seal those kinds of passageways.

Figure 1:
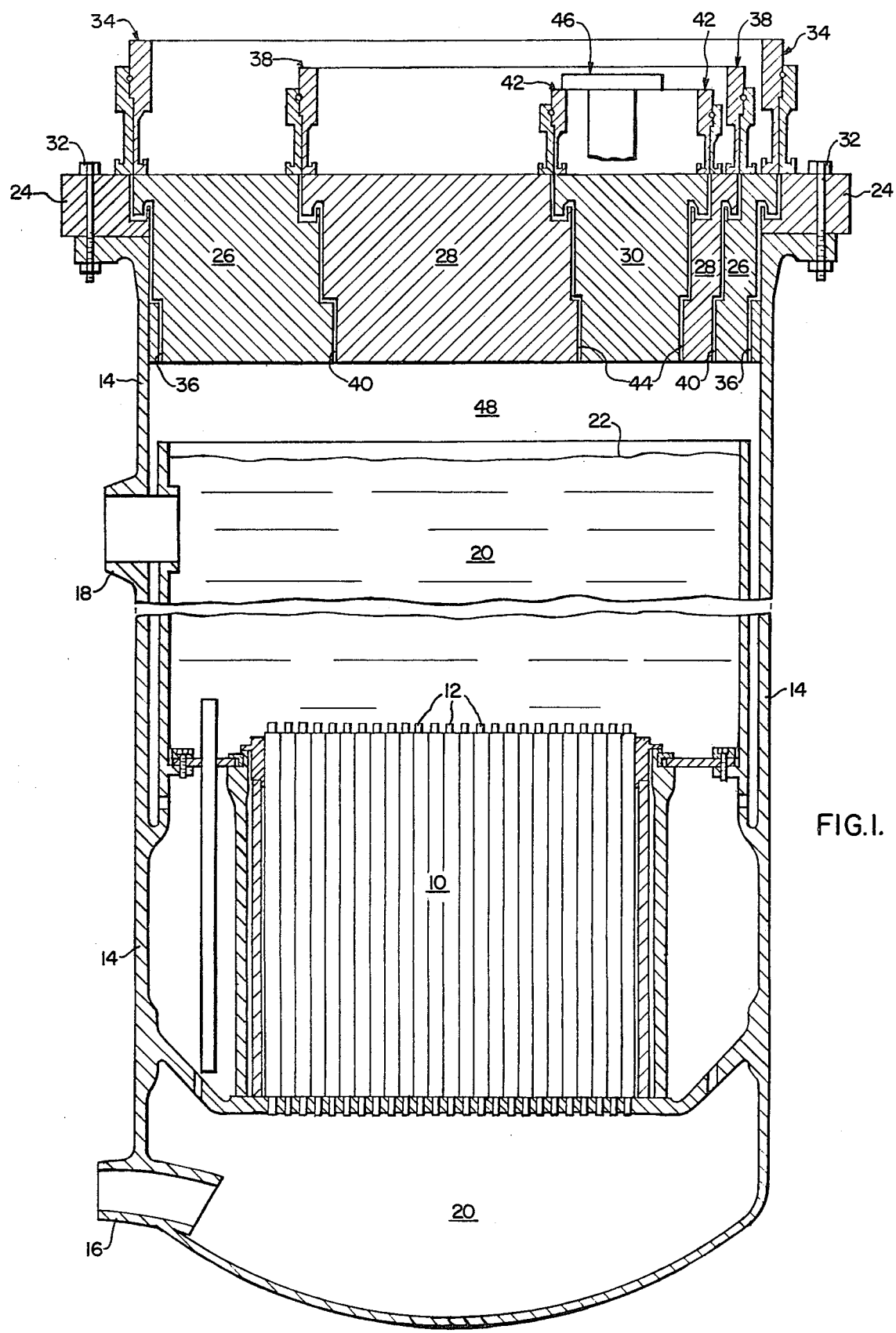
FIG. 1 is a cross-sectional view in elevation of a typical nuclear reactor.

Referring to FIG. 1, a core 10 comprising fuel assemblies 12 that produce heat is contained within a reactor vessel 14. The reactor vessel 14 has an inlet 16 and an outlet 18 that permit a coolant 20 to circulate in a heat transfer relationship with the fuel assemblies 12. The coolant 20, which in a fast breeder reactor may be liquid sodium, fills the reactor vessel 14 to a coolant level 22. The reactor vessel 14 is closed at its top end by a closure head comprising a stationary outer ring 24, a large rotatable plug 26, an intermediate rotatable plug 28, and a small rotatable plug 30. The stationary outer ring 24 may be attached to the reactor vessel by bolts 32 or other suitable means known in the art. The large rotatable plug 26 is supported from the stationary outer ring 24 by large riser assembly 34. The outer peripheral surface of large rotatable plug 26 together with the inner peripheral surface of stationary outer ring 24 define an annulus 36 there between. The large riser assembly 34 which contains bearings, seals, and a plug drive mechanism (not shown) enables the large rotatable plug 26 to move relative to stationary outer ring 24 while maintaining a fluid-tight boundary between the outside and inside of reactor vessel 14. In addition, the large riser assembly 34 locates the bearings, seals, and drive mechanism away from the hot surface of the large rotatable plug 26 thus providing a cooler operating environment and thus allowing a greater range of selectivity of bearings, seals, and drive mechanism materials.

Again referring to FIG. 1, intermediate rotatable plug 28 is disposed eccentrically within large rotatable plug 26 and supported by intermediate riser assembly 38 defining an annulus 40 therebetween in a manner similar to that of the large riser assembly 34. Likewise, the small rotatable plug 30 is similarly eccentrically disposed within intermediate rotatable plug 28 and supported by small riser assembly 42 defining an annulus 44 therebetween. In addition, small rotatable plug 30 has disposed therein an in-vessel transfer collar 46 which provides access for an in-vessel transfer machine (not shown). During refueling, an in-vessel transfer machine which may be chosen from those well known in the art, is placed in the bore of the in-vessel transfer collar 46. When the in-vessel transfer machine is in place in the in-vessel transfer collar 46, a selected combination of rotations of the three rotatable plugs 26, 28, 30 will align the in-vessel transfer machine in appropriate relationship with a chosen fuel assembly 12 of the core 10. As well known in the art, the in-vessel transfer machine may then remove the chosen fuel assembly from the core and replace it with a fresh fuel assembly.

When the reactor coolant 20 is liquid sodium, as in the case of liquid metal fast breeder reactors, it is necessary to avoid contact of the liquid sodium with oxygen because this interaction will result in the formation of impurities in the liquid sodium. To thus avoid this interaction, the space between the bottom of the closure head and the coolant level 22 is filled with a cover gas 48 such as argon. The cover gas 48 not only fills the cover gas space between the bottom of the closure head and the top of the coolant level 22, but it also fills the annuli 36, 40, and 44. While the cover gas 48 prevents oxygen from contacting the coolant 20, the cover gas 48 itself is subjected to radiation exposure from the core and thus becomes contaminated with radioactive particles. It is, therefore, necessary to have the cover gas 48 circulated between the reactor vessel and a cleaning process to remove most of the radioactive particles in a manner well known in the art. As previously indicated, it is, nevertheless, necessary to prevent this cover gas 48 from escaping up the annuli 36, 40, 44 through the seals in the closure head, and out of the reactor vessel.

Figure 2:
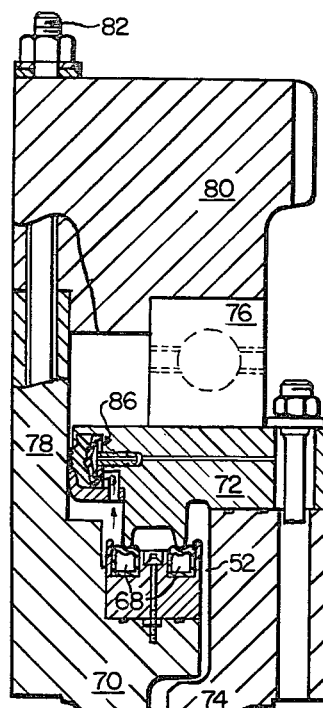
FIG. 2 is a cross-sectional view in elevation of a typical riser assembly with the invention.
Figure 2:
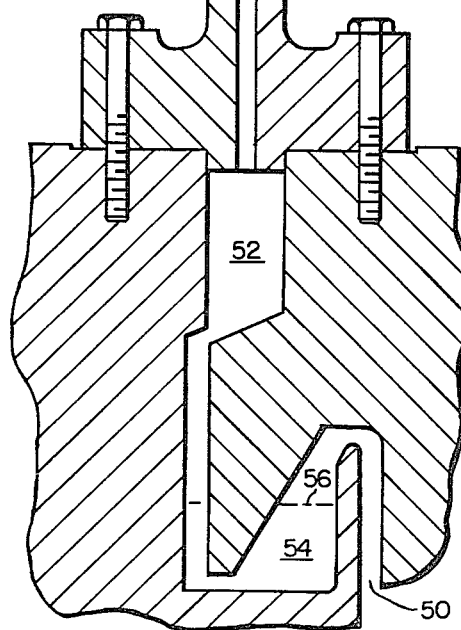

FIG. 2 represents a typical riser assembly which is similar to the riser assemblies 34, 38 and 42. The annuli 36, 40 and 44 are represented by a typical annulus which is divided into two portions 50 and 52. Dividing the lower annulus 50 from the upper annulus 52 is a dip seal 54 which may be chosen from those well known in the art, such as a liquid sodium dip seal. The cover gas 48 fills the lower annulus 50 up to the dip seal level 56. The liquid sodium in dip seal 54 will prevent the contaminated cover gas 48 from migrating from the lower annulus 50 into the upper annulus 52. However, increased cover gas pressure may force cover gas 48 to bubble through dip seal 54 which may result in a small amount of cover gas 48 being released into the upper annulus 52. Under normal reactor conditions, the dip seals 54 can be effective against release of radioactive particles while allowing the rotation of the rotatable plugs.

Again referring to FIG. 2, in order to seal the upper annulus 52 from the atmosphere as a further protection from both oxygen in-leakage and cover gas out-leakage, two inflatable elastomer seals 68 are arranged in series on inner riser 70 in a manner well known in the art. A forked member 72 which is a seal runner is disposed on the outer riser assembly 74 in a manner so as to contact inflatable seals 68 thereby sealing the upper annulus 52. In addition, inner riser 70 is supported from the outer riser assembly 74 by bearing 76 to permit relative rotation between the riser assemblies as the plugs rotate. A lubricant which may be chosen from those well known in the art may be applied to the inflatable seals 68 to insure proper sealing and minimize friction between inflatable seals 68 and forked member 72. During reactor operation the inflatable seals 68 are inflated so that the inflatable seals 68 conform to the surface of forked member 72 and the seating area of the seals thereby increasing contact between the inflatable seals 68 and forked member 72 thus increasing the sealing effect. However, during refueling of the reactor it is necessary to rotate the rotatable plugs. Rotation of the rotatable plugs requires rotation of the inner riser 70 relative to the outer riser 74, which in turn, means that there must be relative rotational motion between forked member 72 and inflatable seals 68. To aid this rotational motion, the inflatable seals 68 are slightly deflated just prior to the time plug rotation takes place.

While the liquid dip seal 54 and inflatable seals 68 are effective under normal reactor conditions, CDA (Core Disruptive Accident) analysis indicates such seals may not be completely effective under all conditions of reactor operation. The hypothesis of the CDA is that the reactor coolant 20 is violently forced toward the bottom of the closure head which in turn forces cover gas 48 up the lower annulus 50. Cover gas 48, under pressure from the reactor coolant force, expels the liquid sodium from dip seal 54 through upper annulus 52 and past the inflatable seals 68. Under CDA hypothesis, it is further hypothesized that the liquid sodium and cover gas passing by inflatable seals 68 will escape from the riser assembly through small gaps around bearing 76. The invention described herein is a further protection against such a release from the riser assemblies.

Figure 3:
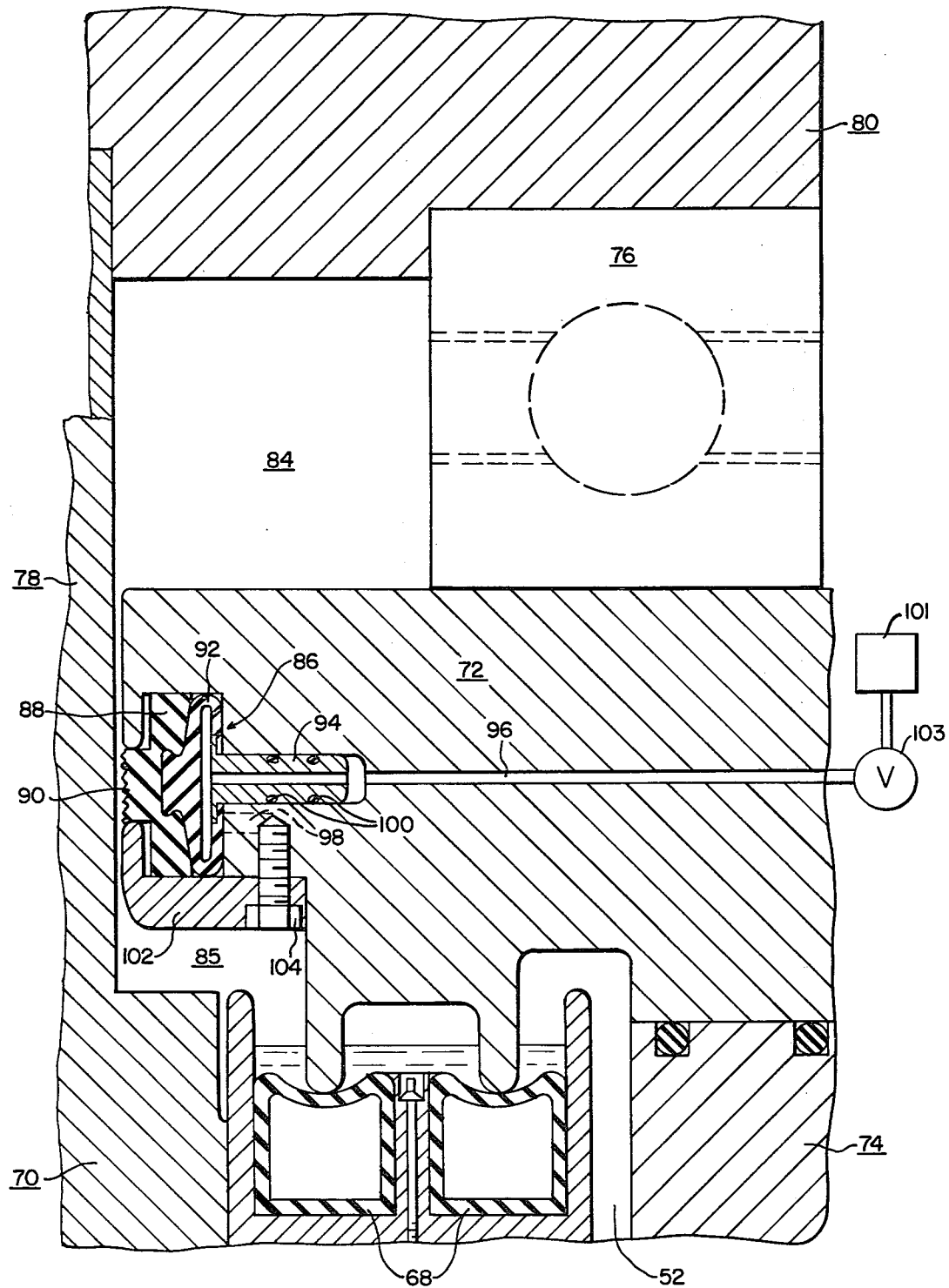
FIG. 3 is a cross-sectional view in elevation of a typical riser assembly showing the invention in detail in the non-actuated position.

Referring now to FIG. 3, the upper portion of the inner riser 70 is divided into two portions, riser segment 78 and gear segment 80. Generally, riser segment 78 is an integral part of inner riser 70 while gear segment 80, which is connected to gears and drive mechanisms (not shown) that allow plug rotation, may be a separable component. Gear segment 80 may be removed from riser segment 78 by releasing bolts 82. Removal of gear segment 80 provides access to bearing 76, to first annular cavity 84, and to second annular cavity 85. First annular cavity 84 is the portion of upper annulus 52 above forked member 72 and second annular cavity 85 is the portion of upper annulus 52 between first annular cavity 84 and inflatable seals 68.

Figure 4:
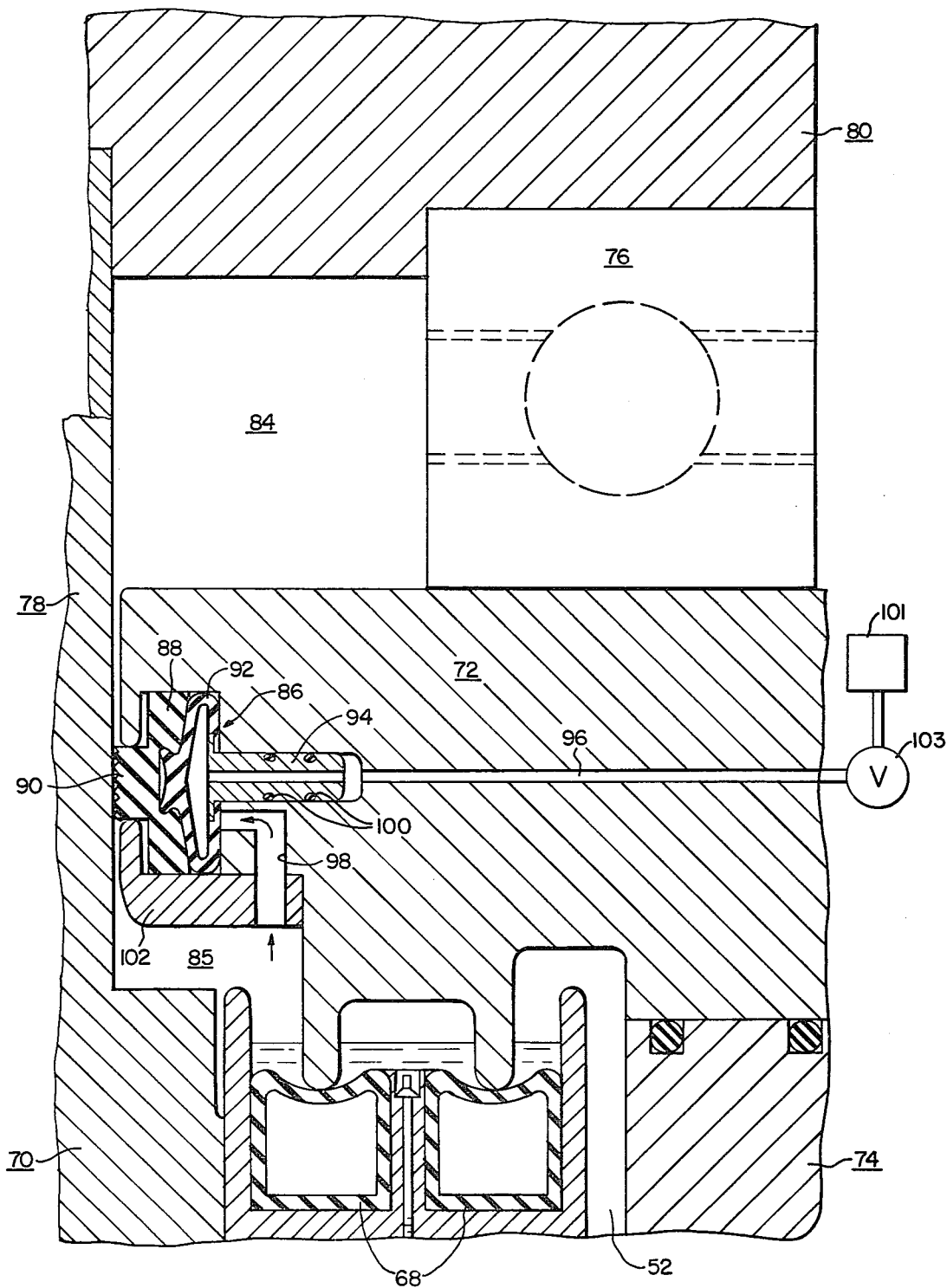
FIG. 4 is a cross-sectional view in elevation of a typical riser assembly showing the invention in detail in the actuated position; and, FIG. 5 is a plan view of the nuclear reactor shown in FIG. 1.
Figure 5:
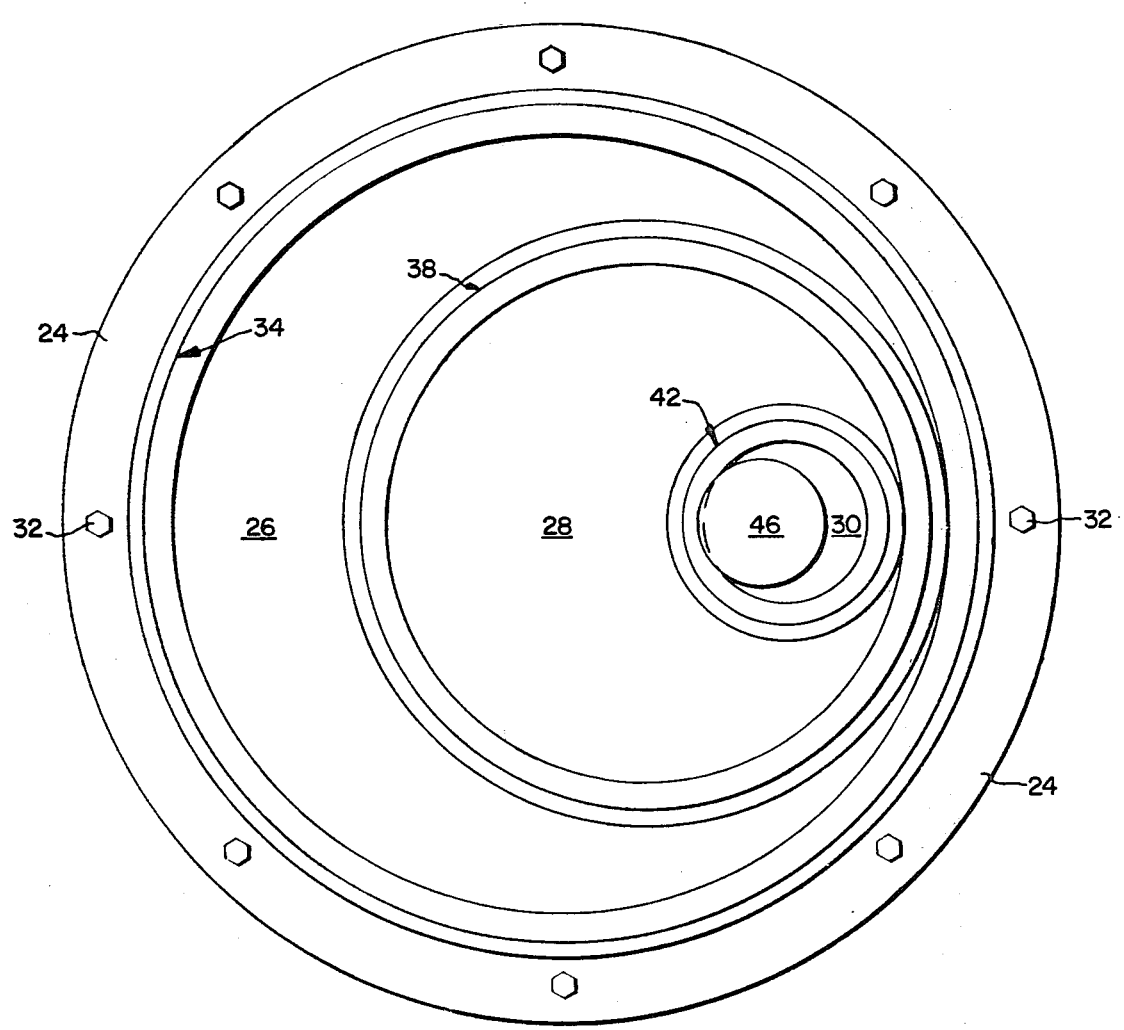

Referring now to FIGS. 3 and 4, disposed in forked member 72 is margin seal 86 which comprises an elastomer ring 88 having a contact surface 90, an inflatable seal 92, metallic stem 94, inflation mechanism 96, and connecting channel 98. Elastomer ring 88 may be a fluoroelastomer ring disposed in forked member 72 and extending around the circumference of forked member 72 while contact surface 90 which may be a corrugated surface extends through a circumferential opening in forked member 72 to near riser segment 78. Inflatable seal 92 may be a silicone tubular inflatable seal that extends circumferentially through forked member 72 and in close proximity to elastomer ring 88. Elastomer ring 88 and inflatable seal 92 may be made in two separate pieces so that elastomer ring 88 may be formed from a material having a high strength characteristic while inflatable seal 92 may be formed from a more flexible material. Alternatively, elastomer ring 88 and inflatable seal 92 may be combined into a single piece having the same characteristics of the two individual pieces. Metallic stem 94 may be a stainless steel tubular piece that is attached to inflatable seal 92 at one or more locations around the circumference of inflatable seal 92. O-ring seals 100 which may be chosen from those well known in the art may be placed around metallic stem 94 in a manner to seal metallic stem 94 in forked member 72. Inflation mechanism 96 which may be a conduit attached to a pressure source 101 of 30 psig located outside the riser assembly is connected to metallic stem 94 so that when activated the pressure source will allow a gas such as argon to flow through metallic stems 94 into inflatable seal 92 thereby inflating inflatable seal 92. Such inflation causes inflatable seal 92 to expand against elastomer ring 88 thereby pushing contact surface 90 into close contact with riser segment 78. The contact of riser segment 78 and contact surface 90 occurs along the entire circumference of contact surface 90 which thereby seals upper annulus 52 and second annular cavity 85 from first annular cavity 84. A check valve 103 chosen from those well known in the art, may be used in conjunction with inflation mechanism 96 to prevent back-flow of gas. Connecting channel 98 may be a conduit which places the side of inflatable seal 92 opposite elastomer ring 88 in fluid communication with second annular cavity 85. Should the second annular cavity 85 become overpressurized while margin seal 86 is activated, connecting channel 98 will conduct a portion of the fluid causing the overpressurization into contact with inflatable seal 92 thereby increasing the pressure on contact surface 90 and thus enhancing the sealing of the annulus. Contact surface 90 may be designed to have a contact area smaller than the area of elastomer ring 88 so that the force applied on elastomer ring 88 will be amplified at contact surface 90. Forked member 72 may be equipped with a plate 102 that is attached to the remainder of forked member 72 by screws 104 so as to provide a mechanism for access to margin seal 86 when forked member 72 is removed from the riser assembly during maintenance. As an alternative margin seal 86 may be disposed near another portion of upper annulus 52 with connecting channel 98 being connected to upper annulus 52 below the contact point of margin seal 86.

OPERATION

During reactor refueling when it is necessary to rotate the closure head plugs and riser assemblies attached thereto with relative ease in order to position refueling machines in appropriate relationship to the core as is well known in the art, inflation mechanism 96 is deactivated which deflates inflatable seal 92, thereby allowing elastomer ring 88 to pull away from riser segment 78 as shown in FIG. 3. When in this non-actuated position, inner riser 70 may rotate, without hindrance, relative to outer riser 74 and forked member 72 attached thereto. However, during reactor operation when it is not necessary to rotate the closure head plugs and riser assemblies attached thereto, inflation mechanism 96 can actuate margin seal 86 as shown in FIG. 4. In actuating margin seal 86, inflation mechanism 96 allows a gas such as argon to flow through metallic stem 94 into inflatable seal 92, thereby inflating inflatable seal 92. Inflation of inflatable seal 92 causes elastomer ring 88 to expand along its circumference which causes contact surface 90 to contact riser segment 78 along the circumferential length of contact surface 90, thereby separating first annular cavity 84 from second annular cavity 85 and isolating upper annulus 52 from the atmosphere outside the riser assembly, thus sealing the annulus defined within the riser assembly. Not only does margin seal 86 form an effective gas seal, but under CDA conditions when second annular cavity 85 is pressurized to 300 psig connecting channel 98 transmits this overpressurization to the backside of inflatable seal 92 which transmits this overpressurization to elastomer ring 88, thereby enhancing the sealing of margin seal 86. Thus, under overpressure conditions, margin seal 86 exerts a higher sealing force along contact surface 90 at a time when such increased force is necessary. It should be noted that contact surface 90 remains in contact with riser segment 78 even when there is relative vertical motion between outer riser 74 and riser segment 78. Therefore, the invention described herein provides an inflatable sealing mechanism disposed in the annulus defined between two rotatable components of a nuclear reactor and having one end of the sealing mechanism in fluid communication with the reactor cover gas so that overpressurization of the reactor cover gas will enhance the sealing of the annulus.

I claim as my invention:

1. A nuclear reactor system including a vessel, fuel assemblies positioned therein, an inlet and an outlet for circulating a coolant in heat transfer relationship with said fuel assemblies, and a closure head disposed on said vessel in a fluid-tight relationship, said closure head comprising:
    a substantially cylindrical outer riser assembly disposed on said reactor vessel and having a forked member disposed therein;
    a substantially cylindrical inner riser assembly disposed in said outer riser assembly and defining an annulus between said riser assemblies;
    an elastomer ring having a corrugated contact surface disposed in said forked member and extending near said annulus for sealing said annulus;
    a tubular inflatable seal disposed in said forked member near said elastomer ring for expanding against said elastomer ring when inflated thereby causing said elastomer ring to radially expand against said inner riser assembly thus sealing said annulus;
    a metallic stem attached to said tubular inflatable seal and a passageway connected between said metallic stem and a gas source for conducting a gas from said gas source to said tubular inflatable seal for inflating said tubular inflatable seal;
    a check valve disposed in said passageway for selectively preventing deflation of said inflatable seal; and
    a conduit disposed in said forked member and having one end disposed in fluid communication with the side of said tubular inflatable seal that is opposite said elastomer ring and having the other end disposed in fluid communication with said annulus below said tubular inflatable seal whereby increased pressure in said annulus below said tubular inflatable seal will be transmitted through said conduit and against said tubular inflatable seal, thus further expanding said tubular inflatable seal and said elastomer ring and thus enhancing contact between said corrugated contact surface and said inner riser assembly.

* * * * *